United States Patent [19]

Eyberger

[11] E Re. 29,795

[45] Reissued Oct. 10, 1978

[54] SELF-CONTAINED FEED ROLL FOR POWER PUNCH PRESSES

[75] Inventor: Harry Eyberger, Pittsburgh, Pa.

[73] Assignee: Vamco Machine and Tool, Inc., Pittsburgh, Pa.

[21] Appl. No.: 861,190

[22] Filed: Dec. 16, 1977

Related U.S. Patent Documents

Reissue of:

[64] Patent No.: 3,483,782
Issued: Dec. 16, 1969
Appl. No.: 651,295
Filed: Jul. 5, 1967

[51] Int. Cl.[2] ..... B26D 5/20

[52] U.S. Cl. ..... 83/245; 83/202; 83/228; 226/154

[58] Field of Search ..... 83/202, 228, 245, 261, 83/253; 226/154–156

[56] References Cited

U.S. PATENT DOCUMENTS

| | | | |
|---|---|---|---|
| 544,665 | 8/1895 | Draher | 226/154 |
| 734,215 | 7/1903 | Bilgram | 83/253 X |
| 1,796,417 | 3/1931 | Wittek | 83/261 X |
| 2,514,261 | 7/1950 | Scheffey | 226/154 X |
| 2,722,276 | 11/1951 | Revelle | 226/155 X |
| 2,998,760 | 9/1961 | Allen | 226/156 X |
| 3,099,180 | 7/1963 | Munschauer et al. | 83/263 X |

*Primary Examiner*—J. M. Meister
*Attorney, Agent, or Firm*—Stanley J. Price, Jr.; John M. Adams

[57] ABSTRACT

A self-contained unit to be attached to a power punch press to provide a feed for stock being fed to the press. The unit contains a direct drive from the punch press crankshaft to feed rolls which are located adjacent to the table of the press. A non-slip, positive, drive is provided from the crankshaft of the punch press to an index drive which receives continuous, uniform rotary motion and converts it into non-continuous, incremental movement of the index drive output shaft. A positive, non-slip drive is provided between the index drive output shaft and the power driven feed roll. The feed roll unit also contains a compressed air-operated cylinder arrangement to release the idler feed roll at a predetermined period during the punch press cycle so that the stock being fed to the press is free from the feed rolls during the pressing portion of the punch press operating cycle. A cam secured to the punch press crankshaft actuates a solenoid valve which, in turn, opens a pilot valve and permits flow of compressed air to reverse the power cylinder, which normally urges the idler feed roll against the power driven feed roll, and thereby releases the idler feed roll to release the stock between the feed rolls of the self-contained unit.

9 Claims, 4 Drawing Figures

INVENTOR.
HARRY EYBERGER
BY
HIS ATTORNEY

INVENTOR.
HARRY EYBERGER
BY George Raynovich
HIS ATTORNEY

INVENTOR.
HARRY EYBERGER
BY George Raynovich
HIS ATTORNEY

INVENTOR.
HARRY EYBERGER
BY George Raynovich
HIS ATTORNEY

SELF-CONTAINED FEED ROLL FOR POWER PUNCH PRESSES

Matter enclosed in heavy brackets [ ] appears in the original patent but forms no part of this reissue specification; matter printed in italics indicates the additions made by reissue.

BACKGROUND OF THE INVENTION

Power punch press feed rolls are well known and commonly employed to feed punch presses when coils or rolls of continuous strip metal are used for feeding the dies of such presses. Automatic roll feed mechanisms are particularly advantageous in high speed automatic power press operations. In punch press feeds, it is also essential at times that the stock being fed to the punch press be released from the feed as the dies of the press contact the stock. Most dies have piloting arrangements which require that the stock be relatively free to adjust itself as the dies stamp their product.

The release of the stock being fed to the punch press from the feed rolls need be only of short duration to permit the strip locating pins or piloting pins in the die mechanism to engage the work piece and accurately locate the same, relative to the die mechanism. Generally, after the die has performed its function, the feed rolls should again be caused to grip the work strip to feed the next segment to the dies.

In addition, the intricate coordination between the feed roll mechanism and the punch press itself require expert technicians to adjust and set the feed roll mechanism on a punch press. During this adjustment, possible die damage could result if the feed setting is inaccurate.

Many prior feed roll mechanisms for punch presses contained clutches and brakes, which did not permit positive drive between the punch press components and the feed roll mechanism. Without positive drive, the punch press feed roll mechanism would get out of time with the press. As the speed was varied, clutches wore or brakes failed causing spoilage of pieces and damage to tooling.

SUMMARY

The present invention is directed to a novel, self-contained feed roll unit for power punch presses. The unit of the present invention is designed to be attached to punch presses without modification of the punch presses and with a minimum of technical skill required to place the feed roll unit onto the punch press. The feed roll unit of the present invention requires no modification to the punch press other than to provide a direct drive between the punch press crankshaft and the feed roll unit. Further, the feed roll unit of the present invention is a self-contained drive mechanism which has its own housing. The housing of the present invention is bolted onto a punch press and is ready for operation on the press.

The feed roll unit of the present invention provides positive, direct drive between the crankshaft of the punch press and the feed rolls. There is no slippage, clutches, brakes, or other friction-type mechanisms which can cause loss of timing or costly repairs.

Further, the feed roll unit of the present invention provides a novel release means which permits the feed stock to the punch press to be released from the feed rolls during the pressing portion of the operating cycle of the punch press.

With the foregoing considerations in mind, it is an object of the present invention to provide an improved feed roll unit for a punch press.

Another object of the present invention is to provide a self-contained feed roll unit for a punch press.

Another object of the present invention is to provide a feed roll unit having feed roll release means which permit the stock being fed to the punch press to be released during the pressing portion of the operating cycle.

Another object of the present invention is to provide a feed roll unit that enables the punch press to run at higher speeds since the feeding accuracy of this unit is not affected by press speeds.

Another object of the present invention is to provide a feed roll unit which has a direct, non-friction-type drive between the punch press crankshaft and the feed rolls.

These and other objects of the present invention will become apparent as this description proceeds in conjunction with the accompanying drawings.

DESCRIPTION OF THE PREFERRED EMBODIMENT

Figure 1:
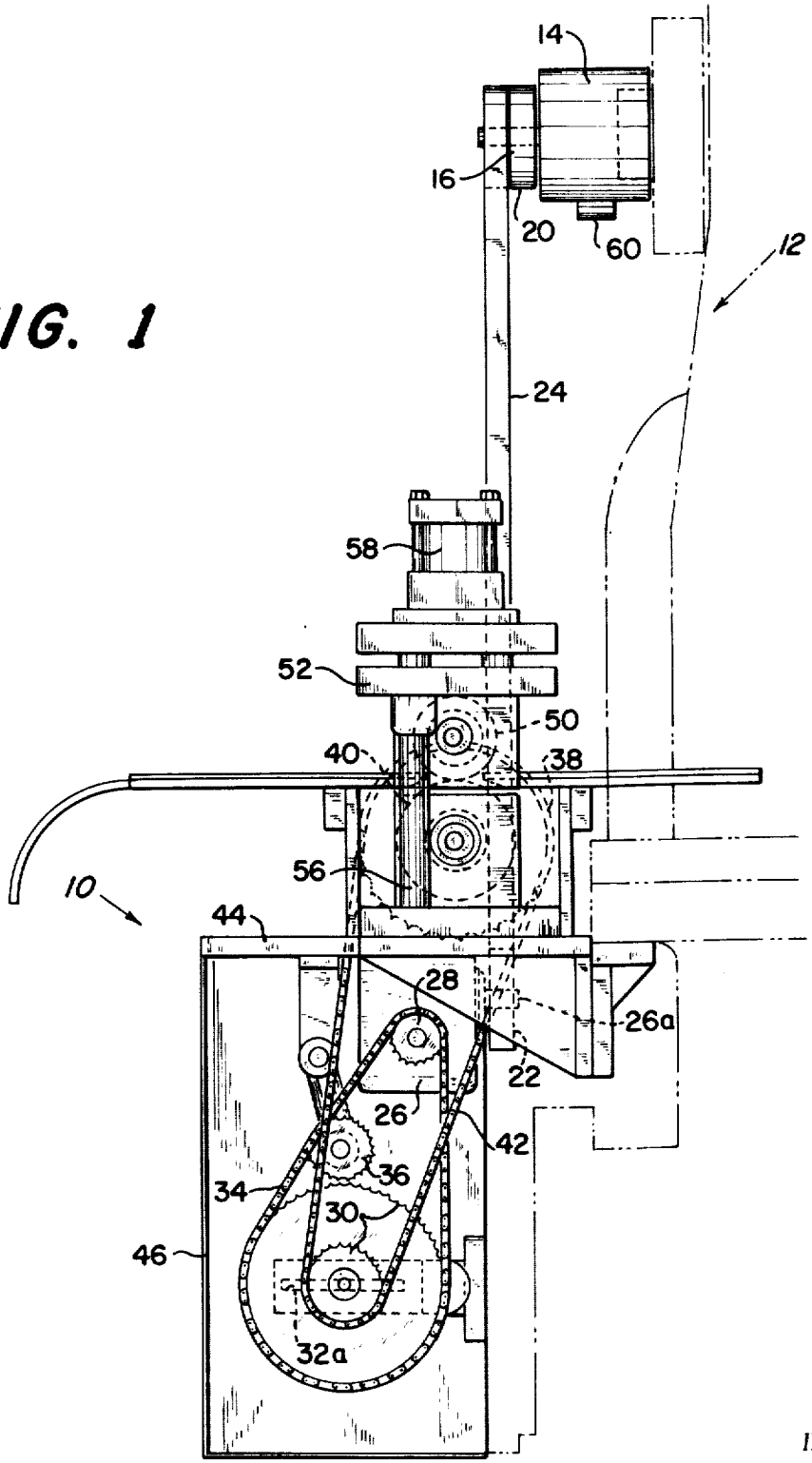
FIG. 1 is a front elevational view of the feed roll unit of the present invention with a portion of the housing removed and showing a portion of the punch press in phantom view.
Figure 2:
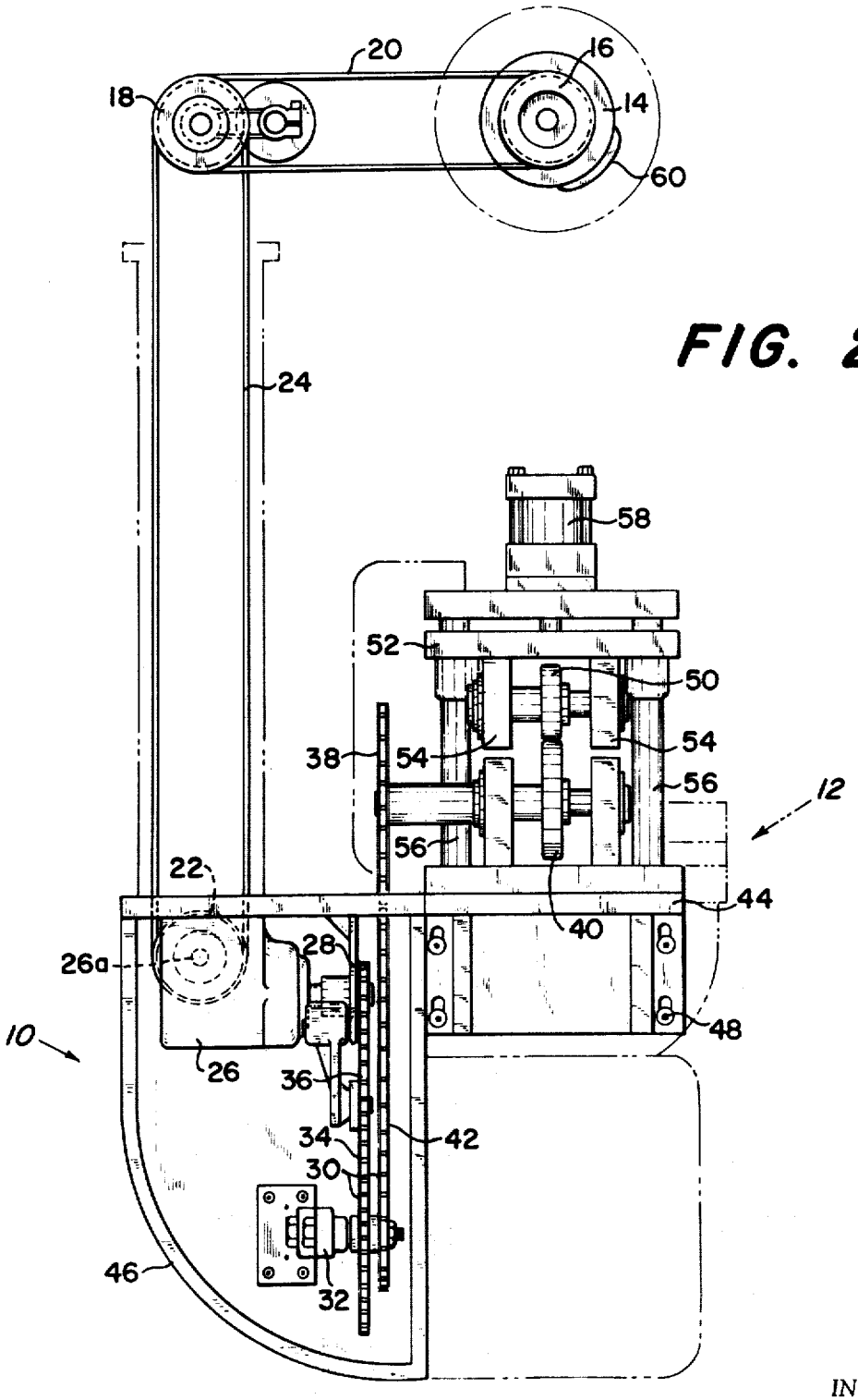
FIG. 2 is a side elevation similar to FIG. 1 showing the feed roll unit of the present invention with the housing removed.
Figure 3:
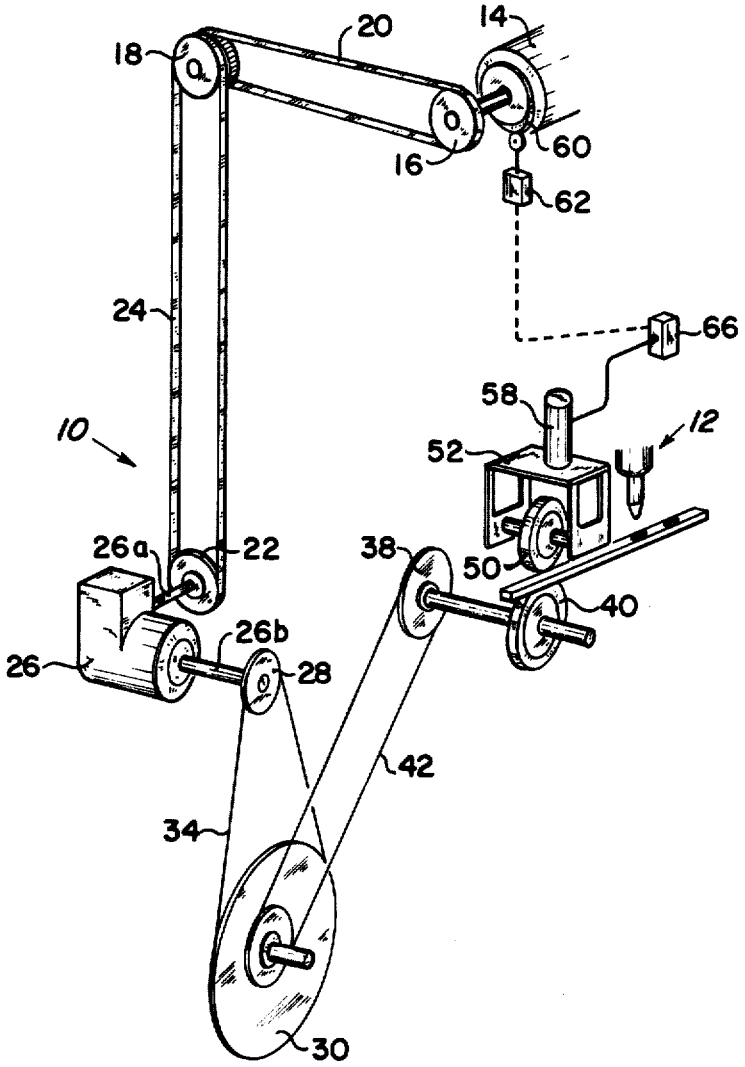
FIG. 3 is a diagrammatic perspective representation of the working portions of the feed roll mechanism of the present invention in semi-schematic form.

Referring to the drawings, and particularly to FIGS. 1, 2 and 3, there is shown a self-contained feed roll unit 10 attached to a power press 12 shown in phantom outline. A punch press 12 has a crankshaft 14 which rotates in timed relation to the dies (not shown) of the punch press so that there is a timed relationship to the pressing portion of the punch press operating cycle and the rotational speed of the punch press crankshaft 14.

A drive pully 16 is fixed to the punch press crankshaft 14 and is of the toothed, non-slip type. An idler pully 18, containing two pullies which rotate as a unit and which are of the toothed, non-slip type, is rotatably secured to the feed roll unit in spaced relation to the power press crankshaft drive pully 16. A non-slip type toothed belt drivingly connects the pully 16 to the idler pully 18.

An index drive input pully 22, of the non-slip type, is driven from idler pully 18 through non-slip drive belt 24. The input pully 22 is non-rotatably fixed to the input shaft of index drive 26. Index drive 26 is preferably but not necessarily a commercially available, right angle index drive manufactured by Commercial Can and Machine Company of Chicago, Ill., or Ferguson Machine Company of St. Louis, Mo. The index drive 26 receives continuous, uniform, rotating motion through input shaft 26a to which the input pully 22 is fixed. This continuous, uniform, rotating motion is converted by the index drive to a non-continuous, step-by-step, incremental motion that is transmitted by index drive output shaft 26b.

An output sprocket 28 is non-rotatably secured to index drive output shaft 26b. A double idler sprocket 30 is freely and rotatably supported on support member 32. Support member 32 is fixed to the housing of the self-contained feed roll unit 10 and contains an elongated, slotted hole 32a to receive the shaft of idler sprocket 30. The slotted hole 32a permits adjustment of the idler pully in various positions to accommodate various size chains and pullies to thereby adjust the feed stroke of the feed roll unit in a manner to be more fully hereinafter explained.

A drive chain 34 drivingly connects the index drive output sprocket 28 to one portion of the double idler sprocket 30. A chain tension sprocket 36 is supported from the housing of the feed roll unit 10 to tension chain 34 in the proper manner even though the sizes of idler sprocket 30 may change.

A feed roll drive sprocket 38 is non-rotatably secured to the same shaft to which the power driven feed roll 40 is secured. A drive chain 42 drivingly connects the double idler sprocket 30 to the feed roll drive sprocket 38 to thereby drive the power driven feed roll.

The power driven feed roll 40 is rotatably supported upon a table 44 which forms a portion of the housing 46 for feed roll drive unit 10. The housing 46 is bolted to the frame of the power press 12 by bolts 48 (FIG. 2).

An idler feed roll 50 is rotatably supported on a movable frame 52. The shaft for idler feed roll 50 has trunion mounts 54 that depend from movable frame 52. Upright members 56 (FIG. 2) slidingly receive the movable frame 52.

A power cylinder 58 is fixed to the housing of the feed roll unit 10 and the piston 58a of power cylinder 58 is connected to movable frame 52 so that the extended piston of power cylinder 58 normally urges the idler feed roll 50 into contact with power driven feed roll 40 to catch the feed stock therebetween and thereby feed the feed stock to the dies of the power press. Under certain conditions, the power of power cylinder 58 can be reversed to release the idler feed roll 50 from the power driven feed roll 40 and thereby release the stock being fed to the dies of the power press.

The power cylinder 58 which controls the idler feed roll 50 is, itself, controlled by a compressed air circuit and valves which operate directly in response to a cam 60 fixed to the crankshaft 14 of power press 12. The cam 60 is operable to actuate a limit switch 62 (FIGS. 3 and 4) during a certain portion of the rotational cycle of crankshaft 14.

Figure 4:
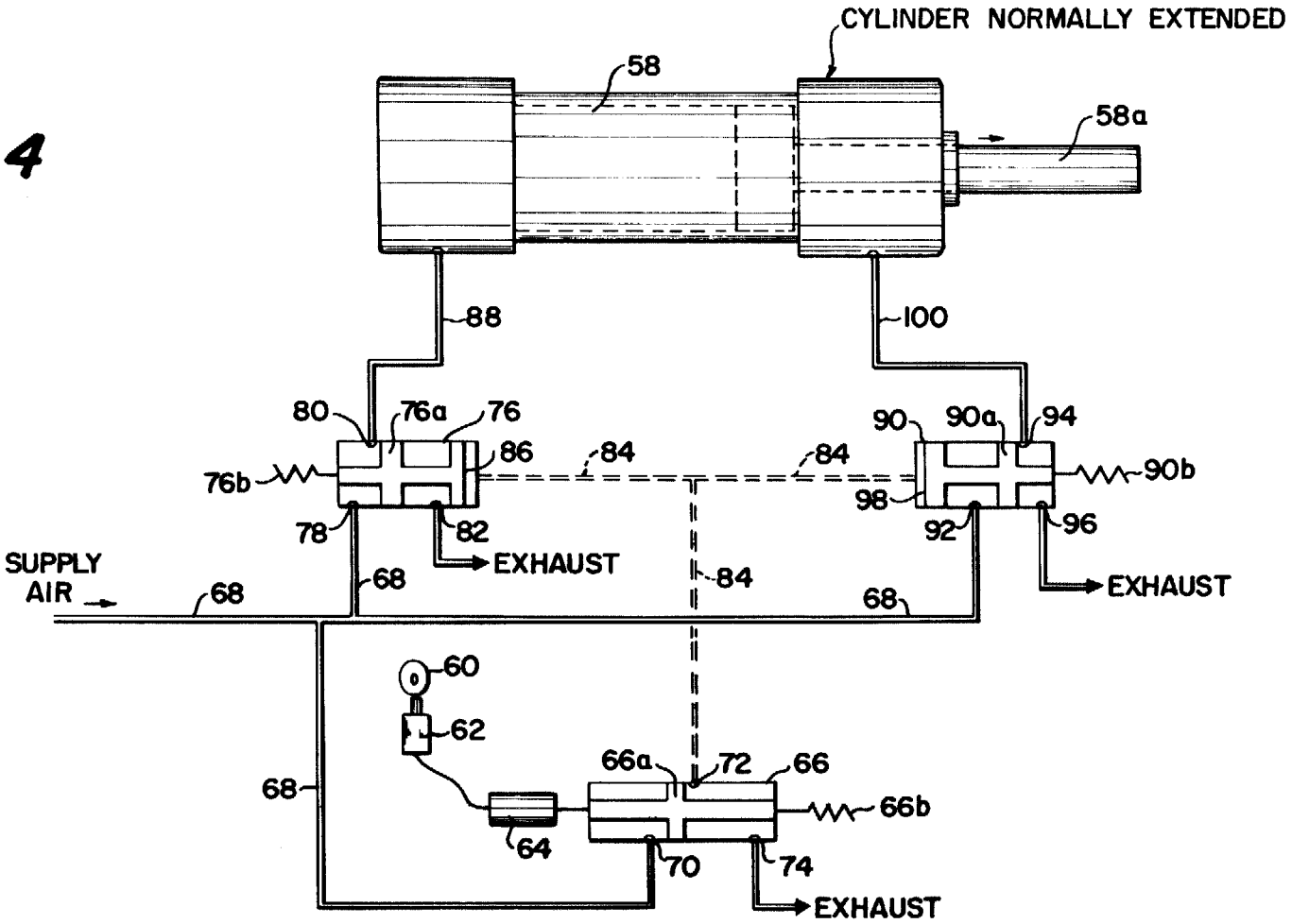
FIG. 4 is a schematic drawing of the components and circuit for the feed roll release means of the present invention.

When the limit switch 62 is actuated, it provides power to a solenoid switch 64 which actuates a pilot valve 66 (FIG. 4). Pilot valve 66 is a spool valve which has a spool 66a mechanically connected to solenoid switch 64. The spool 66a is urged by spring 66b to the position shown in FIG. 4.

A source of compressed air is directed through air supply line 68 to inlet port 70 of pilot valve 66. The air supply line 69 also provides an air supply to other valves as shall be hereinafter more fully described.

When the pilot valve 66 is in the non-actuated position shown in FIG. 4, the spool 66a prevents passage of air from inlet port 70 to power port 72 in valve 66. When, however, the solenoid 64 actuates the spool 66a the spool 66a is moved to the right as viewed in FIG. 4, against the force of spring 66b and the inlet port 70 is permitted to communicate with the power port 72 thereby causing a flow of air under pressure through the pilot valve 66.

A spool valve 76 having a spool 76a urged to the position shown in FIG. 4 by spring 76b controls the flow of air from its inlet port 78 to a power port 80 in valve 76. An exhaust port 82 is provided to exhaust flud from valve 76 under certain circumstances. Valve 76 directly receives air under pressure through lines 68 and, in the normal course of events, permits fluid under pressure to flow through inlet port 78 to outlet port 80 and thence through power line 88 to maintain the piston 58a of power cylinder 58 to the normally extended position.

When the solenoid 64 actuates the pilot valve 66 to permit flow of air under pressure through inlet port 70 to outlet port 72 and thence through pilot line 84, the air under pressure acts on the cylinder face 86 of spool 76a of valve 76 to thereby urge the valve spool 76a to the left as viewed in FIG. 4 and to thereby exhaust a portion of the cylinder 58 which normally maintains piston 58a to the extended position.

A valve 90 operates to retract piston 58a of cylinder 58 when solenoid 64 is actuated. The valve 90 has a spool 90a which is urged to the position shown in FIG. 4 by spring 90b. The valve 90 has an inlet port 92 through which it receives air under pressure through line 68. A power port 94 is normally closed from the inlet port 92 by the construction of spool 90a. The valve 90 also has an exhaust port 96 which is normally in communication with power port 94 so that the portion of the cylinder 58 in front of piston 58a is normally exhausted.

When air in pilot line 84 acts on the cylinder face 98 of spool 90a, the valve spool 90a is urged to the right as viewed in FIG. 4, against the force of spring 90b, thereby causing inlet port 92 to come into communication with power port 94 and cause fluid under pressure from line 68 to enter behind the piston 58a and retract the piston 58a.

It can be seen that when solenoid 64 actuates pilot valve 66, air through pilot line 84 simultaneously actuates valves 76 and 90. Valve 76 is effectively closed and the space in front of piston 58a is vented to exhaust through exhaust port 82. At the same time, the space on the other side of piston 58a is subjected to fluid pressure through line 100 which connects the power port 94 to the cylinder 58.

OPERATION

As the crankshaft 14 of punch press 12 rotates during the operating cycle of the power press, a direct, non-slip drive is formed through pulley 16, belt 20, idler pulley 18, and belt 24, to the index drive input pulley 22. The index drive 26 then converts the continuous, uniform rotary motion into an indexed, non-continuous, incremental, step-by-step motion to its output sprocket 28. This step-by-step motion is transmitted from output sprocket 28 to idler sprocket 30 which controls the speed of power driven feed roll 40 through power feed roll drive sprocket 38.

It may be seen that by placing various combinations of sprockets 28, 30 and 38, of different sizes, the amount of lineal motion imparted to the feed stock through power driven feed roll 40 may be varied for any single rotation of crankshaft 14. Thus, the exact length of feed desired may be controlled by changing the size of the sprockets. The indexing increment can also be increased or decreased by the use of various gear trains (not shown) in place of chains 34 and 42 and sprockets 28, 30 and 38.

When the size of idler sprocket 30 is changed, it is positioned along the slotted hole 32a of the support 32 so that drive chain 42 is in proper tension. The chain tensioner sprocket 36 is then adjusted to properly tension drive chain 34 so that a direct drive is provided between the index drive 26 and the power driven feed roll 40.

At the same time that the punch press crankshaft 14 rotates, it actuates limit switch 62, through cam 60, which in turn causes periodic actuation of solenoid 64. Each time solenoid 64 is actuated, the piston 58a of power cylinder 58 retracts from its normally extended position and causes the idler feed roll 50 to be withdrawn and retracted from power driven feed roll 40. Accordingly, the stock being fed to the power press is released from the feed roll for a period of time, as desired, until the cam passes out from under the limit switch 62. At that point, power is restored to the power cylinder 58 and the normally extended piston 58a causes the idler feed roll to bear against the power driven feed roll 40.

It can be seen that the structure of the present invention provides a self-contained feed roll unit for a power press which may be readily installed on a punch press and can feed stock to the dies of the press. Further, there is positive drive to all components of the feed roll unit of the present invention, and the force on the feed rolls may be released periodically during the pressing operation.

It will also be appreciated that the self-contained feed roll unit of the present invention can be operated without utilizing the feed roll release means of the present invention if the particular job does not require the feed stock to be released during the pressing operation.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A self-contained feed roll unit for a power punch press having a crankshaft rotating in timed relation to the pressing portion of the operating cycle of said punch press, said feed roll unit comprising:

(a) a power driven feed roll;

(b) an idler feed roll rotatably supported on a movable frame and normally urged toward said power driven feed roll, said idler feed roll being periodically moved away from said power driven feed roll by feed roll release means to free stock being fed to said power pass during the pressing portion of said power press operating cycle;

(c) an index drive having an input shaft to receive continuous, uniform rotary motion and an output shaft transmitting non-continuous, incremental rotary motion;

(d) first positive drive means drivingly connecting said index drive input shaft to said power press crankshaft; and (e) second positive drive means [drivingly connecting] *including a first drive member connected to said index drive output shaft, a driven member connected to said power driven feed roll, an idler member drivingly connected to said first drive member and said driven member to thereby drivingly connect* said index drive output shaft to said power driven feed roll, said second positive drive means being adjustable to vary the ratio of the angular velocity of said index drive output shaft relative to said power driven feed roll.

2. The self-contained feed roll unit of claim 1 wherein said second positive drive means is formed of chains and sprockets connecting said index drive output shaft and said power driven feed roll and the length of stock fed to said power press is varied by changing the sizes of said sprockets.

3. The self-contained feed roll unit of claim 1 wherein said feed roll release means comprises:

(a) a compressed air powered reversible cylinder normally urging said idler feed roll frame toward said power driven feed roll, but actuatable to move said feed roll frame away from said power driven feed roll;

(b) cam means connected to said punch press crankshaft to actuate an electrical solenoid valve while said press is in said pressing portion of said operating cycle;

(c) pilot valve means actuated by said solenoid valve to control flow of compressed air to said reversible cylinder; and (d) a compressed air circuit between a source of air under pressure and said reversible cylinder and controlled by said pilot valve means to reverse said cylinder when said cam means actuates said solenoid valve.

*4. The self-contained feed roll unit of claim 1 wherein the length of the stock fed to said power press is varied by changing the size of at least one of said first drive member, said idler drive member and said driven member.*

*5. The self-contained feed roll unit of claim 1 wherein the length of stock fed to said power press is varied by changing the size of said idler drive member.*

*6. The self-contained feed roll unit of claim 1 wherein the length of stock fed to said power press is varied by changing the size of said first drive member.*

*7. The self-contained feed roll unit of claim 1 wherein the length of stock fed to said power press is varied by changing the size of said driven member.*

*8. The self-contained feed roll unit of claim 1 which includes,*

*means to adjust said idler drive member relative to said first drive member and said driven member to permit mounting different sized first drive members, idler drive members and driven members to thereby vary the length of the stock fed to said power press.*

*9. The self-contained feed roll unit of claim 1 which includes,*

*means mounting said index drive output shaft in fixed spaced relation to said power driven feed roll.*

* * * * *